UNITED STATES PATENT OFFICE.

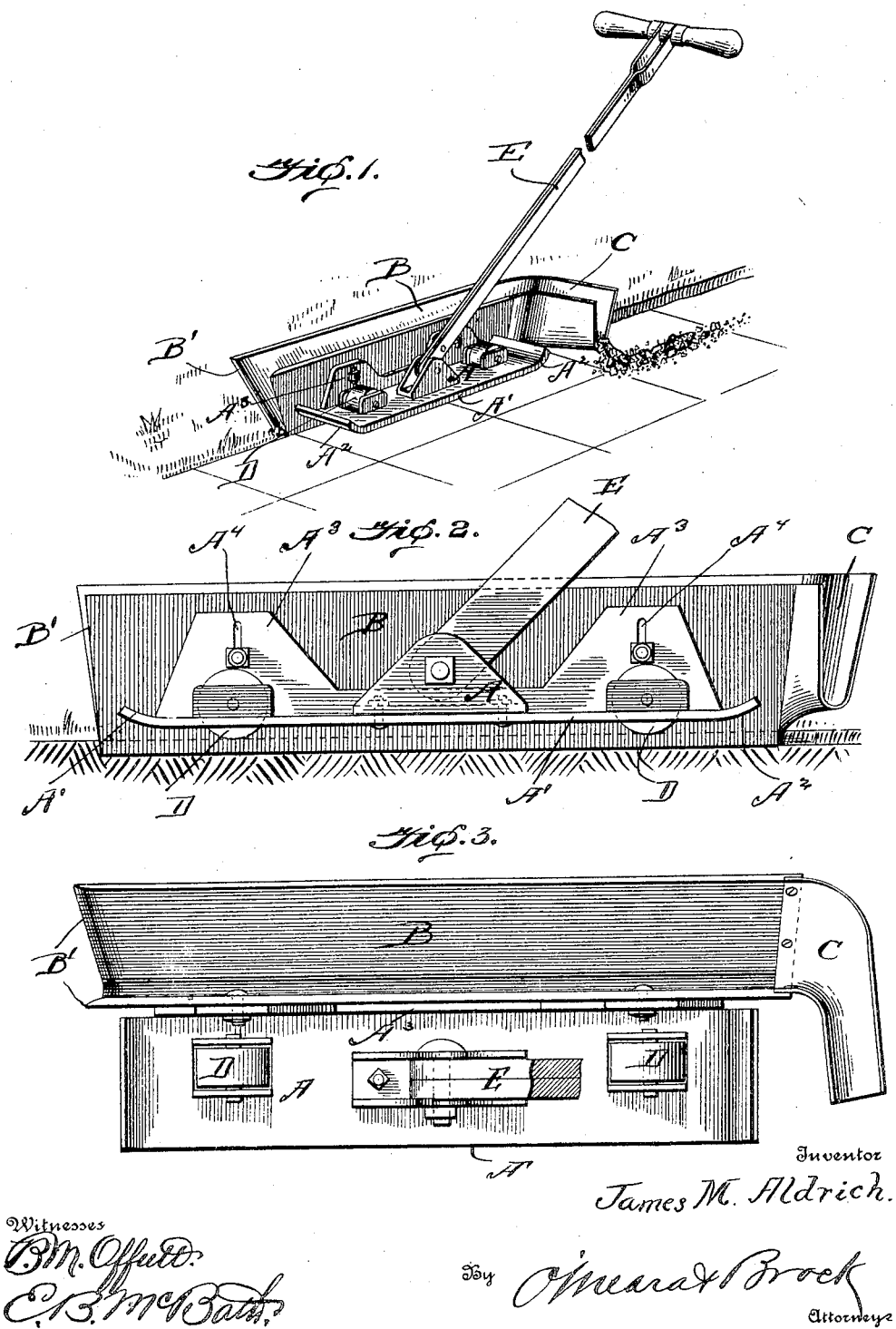

JAMES M. ALDRICH, OF ADRIAN, MICHIGAN.

LAWN-EDGE TRIMMER AND DITCHER.

No. 818,510.  Specification of Letters Patent.  Patented April 24, 1906.

Application filed July 19, 1905. Serial No. 270,353.

*To all whom it may concern:*

Be it known that I, JAMES M. ALDRICH, a citizen of the United States, residing at Adrian, in the county of Lenawee and State of Michigan, have invented a new and useful Improvement in a Lawn-Edge Trimmer and Ditcher, of which the following is a specification.

This invention is a device for trimming an edge of a lawn in order to provide a neat and even edge where the lawn meets the walk or path; and the object of the invention is to provide a device which will not only trim the edge of the lawn, but will also provide a shallow ditch between the lawn and path; and a still further object of the invention is to provide a device of such construction that the dirt removed during the operation will be discharged at the rear upon the walk or path in such a manner as to render it easy of collection.

With these and certain other objects in view my invention consists in the combination of a carriage and a V-shaped trimming-blade connected thereto and provided with a discharge-chute at the rear end thereof.

The invention also consists in certain details of construction and novelties of combination, all of which will be fully described hereinafter and pointed out in the claims.

In the drawings forming a part of this specification, Figure 1 is a perspective view of a combined trimmer and ditcher constructed in accordance with my invention. Fig. 2 is a side view of the same. Fig. 3 is a top plan view.

In carrying out my invention I employ a carriage A, which is preferably made of cast metal and comprises the base-plate A', turned slightly upward at each end, as shown at A², and upon the inner side the base-plate is provided with a flange or side A³, which is slotted longitudinally, as shown at A⁴, to receive the bolts by means of which the V-shaped trimmer-blade B is connected to the carriage, these slots being provided to permit the trimmer-blade to be adjusted in order to cut a shallow or deep ditch.

The forward edge of the trimmer-blade is sharpened, as shown at B', and at the rear end is connected a discharge-chute C, which is bent or curved, so as to discharge the dirt upon the walk or path, as most clearly shown at Fig. 1.

The carriage A is supported upon rollers D, and a handle E is connected to the carriage at the center thereof.

In operation the carriage is caused to travel along the edge of the walk or path adjacent the edge of the lawn, and the trimmer-blade is adjusted to cut the desired depth, and as the carriage is pushed forwardly by means of the handle the sharpened edges of the trimmer-blade will cut away the edge of the lawn and cut a ditch or trench between the lawn and the walk, the depth of which will be regulated by the adjustment of the trimmer-blade. As the device is pushed forwardly the earth and grass removed will be fed along through the V-shaped trimmer-blade and discharged at the rear end through the chute C, and it will be noted that this discharge takes place upon the walk or path, from which it can be quickly and easily collected.

It will thus be seen that I provide a simple, durable, and efficient construction of combination lawn-trimmer and ditcher capable of successfully carrying out all of the objects hereinbefore referred to.

Having thus fully described my invention, what I claim as new, and desire to secure by Letters Patent, is—

1. The combination with a carriage, of a trimmer-blade adjustably connected thereto and provided with a discharge-chute.

2. The combination with a carriage, of a V-shaped trimmer-blade, adjustably connected thereto and provided with a curved discharge-chute.

3. The combination with a carriage, of a V-shaped trimmer-blade, the forward edges of which are sharpened, the rear end being provided with a discharge-chute.

4. The combination with a carriage having a handle connected thereto, of a V-shaped trimmer-blade adjustably connected to one side of the carriage, the forward edge of said trimmer-blade being sharpened, and a curved discharge-chute connected to the rear end of the trimmer-blade, as set forth.

5. The combination with a carriage having a base-plate with turned-up ends and a flanged side, of a V-shaped trimmer-blade adjustably connected to said flange provided with a discharge-chute, and a handle connected to said plate, as set forth.

6. The combination with a carriage having a base-plate mounted on wheels and provided with a flanged side, slots formed in said flange, of a V-shaped trimmer-blade provided with bolts working in said slots, and a curved discharge-chute connected to the rear end of the trimmer-blade, as set forth.

7. The combination with a base-plate provided with turned-up ends mounted on rollers, a flange formed on one side of said plate provided with slots, of a trimmer-blade carrying bolts working in said slots of the flange, an inwardly-projecting discharge-chute connected to the rear of the trimmer-blade, and a handle connected to the base-plate, as set forth.

JAMES M. ALDRICH.

Witnesses:
P. H. BURNHAM,
FRANK L. HOUGH.